United States Patent
Khadiya

(10) Patent No.: US 9,896,985 B2
(45) Date of Patent: Feb. 20, 2018

(54) METHOD AND APPARATUS FOR RECOVERING ENERGY FROM COOLANT IN A VEHICLE EXHAUST SYSTEM

(71) Applicant: Faurecia Emissions Control Technologies, Columbus, IN (US)

(72) Inventor: Navin Khadiya, Cedar Falls, IA (US)

(73) Assignee: Faurecia Emissions Control Technologies, Columbus, IN (US)

( * ) Notice: Subject to any disclaimer, the term of this patent is extended or adjusted under 35 U.S.C. 154(b) by 531 days.

(21) Appl. No.: 13/647,436

(22) Filed: Oct. 9, 2012

(65) Prior Publication Data

US 2013/0086902 A1 Apr. 11, 2013

Related U.S. Application Data

(60) Provisional application No. 61/545,231, filed on Oct. 10, 2011.

(51) Int. Cl.
| | |
|---|---|
| *F01K 23/10* | (2006.01) |
| *F02G 3/00* | (2006.01) |
| *F01N 5/02* | (2006.01) |
| *F01K 23/06* | (2006.01) |
| *F02G 5/04* | (2006.01) |
| *F01P 9/06* | (2006.01) |

(52) U.S. Cl.
CPC ............. *F01N 5/02* (2013.01); *F01K 23/065* (2013.01); *F01K 23/10* (2013.01); *F02G 5/04* (2013.01); *F01P 9/06* (2013.01); *F02G 2260/00* (2013.01); *Y02T 10/16* (2013.01); *Y02T 10/166* (2013.01)

(58) Field of Classification Search
CPC .......... F01K 23/065; F01K 23/10; F02G 5/04; F02G 2260/00; F02G 2262/00; F01P 9/06; Y02T 10/166; Y02T 10/16
USPC ...................... 60/616–618; 123/41.33, 41.42
See application file for complete search history.

(56) References Cited

U.S. PATENT DOCUMENTS

| | | | | |
|---|---|---|---|---|
| 4,003,345 A | * | 1/1977 | Bradley | ........................... 60/618 |
| 4,366,674 A | | 1/1983 | Eakman | |
| 2004/0187506 A1 | | 9/2004 | Iwanami et al. | |
| 2004/0211180 A1 | | 10/2004 | Hisanaga | |
| 2005/0262842 A1 | * | 12/2005 | Claassen et al. | ............... 60/618 |
| 2008/0087238 A1 | * | 4/2008 | Held et al. | ................. 123/41.48 |
| 2010/0101224 A1 | * | 4/2010 | Kasuya et al. | ................. 60/597 |
| 2010/0192569 A1 | * | 8/2010 | Ambros et al. | ................. 60/602 |
| 2010/0300100 A1 | * | 12/2010 | Harmon et al. | ................ 60/645 |

FOREIGN PATENT DOCUMENTS

DE 102011122196 A1 * 6/2013 ............... F02G 5/00

* cited by examiner

*Primary Examiner* — Ngoc T Nguyen
(74) *Attorney, Agent, or Firm* — Carlson, Gaskey & Olds, PC

(57) ABSTRACT

A heat recovery system includes an engine coolant circuit and an exhaust gas recovery circuit. The engine coolant circuit uses an engine coolant fluid to cool an engine. The exhaust gas recovery circuit comprises a Rankine cycle system that uses a working fluid to convert heat from engine exhaust gases to energy. The engine coolant fluid comprises the working fluid such that the engine coolant circuit and an exhaust gas recovery circuit comprise a common circuit such that the Rankine cycle system recovers energy from exhaust gas heat and from engine coolant heat.

11 Claims, 2 Drawing Sheets

METHOD AND APPARATUS FOR RECOVERING ENERGY FROM COOLANT IN A VEHICLE EXHAUST SYSTEM

RELATED APPLICATION

This application claims priority to U.S. Provisional Application No. 61/545,231, filed Oct. 10, 2011.

TECHNICAL FIELD

The subject invention relates to a method and apparatus that recovers energy from coolant, exhaust, and/or exhaust gas recirculation (EGR) in a vehicle exhaust system.

BACKGROUND OF THE INVENTION

An exhaust system conducts hot exhaust gases generated by an engine through various exhaust components to reduce emissions. An engine coolant circuit is utilized by the engine to prevent the engine from overheating. Roughly one third of engine energy is lost in exhaust and another one third is lost in engine coolant. Some of this exhaust energy is recovered using a Rankine cycle which uses a working fluid to convert heat to work. The working fluid in a Rankine cycle follows a closed loop and is reused constantly. Typically, the working fluid is water, which is pumped from low to high pressure at the beginning of the cycle. The high pressure liquid is then heated by engine exhaust gases to become a vapor. The vapor enters a turbine to generate a work output, such as electrical energy for example. Condensation of the fluid in the turbine occurs such that fluid exiting the turbine is a low pressure vapor, which is subsequently fed into a condenser and then returned to a pump at the beginning of the cycle.

As discussed above, exhaust energy is recovered through the Rankine cycle. However, engine coolant heat is identified as a "low grade" source and is not considered as being capable of serving as a source for energy recovery. Recovering energy from the coolant in addition to recovering the exhaust energy would significantly improve engine efficiency.

SUMMARY OF THE INVENTION

A heat recovery system includes an engine coolant circuit and an exhaust gas recovery circuit. The engine coolant circuit uses an engine coolant fluid to cool an engine. The exhaust gas recovery circuit comprises a Rankine cycle system that uses a working fluid to convert heat from engine exhaust gases to energy. The engine coolant fluid comprises the working fluid such that the engine coolant circuit and an exhaust gas recovery circuit comprise a common circuit such that the Rankine cycle system recovers energy from exhaust gas heat and from engine coolant heat.

In one exemplary embodiment, the working fluid comprises ethylene glycol.

In a further embodiment of the above, the system includes a pump that pumps the working fluid to an engine coolant inlet, an evaporator that receives the working fluid from an engine coolant outlet and receives the heated exhaust gases from the engine, an expander that receives vaporized working fluid from the evaporator, and a condenser that receives working fluid from the expander and conducts the working fluid to the pump.

In a further embodiment of any of the above, the system includes an exhaust gas recirculation circuit that supplies heat to the evaporator.

In a further embodiment of any of the above, the system includes a variable coolant bypass circuit that selectively allows a portion of the working fluid exiting the condenser to bypass the engine and enter the evaporator.

In one example embodiment, a method of recovering energy comprises the steps of generating engine exhaust gas, recovering energy from the engine exhaust gas using a Rankine cycle system having a working fluid, and recovering engine coolant energy by cooling the engine with a coolant that comprises the working fluid.

These and other features of this application will be best understood from the following specification and drawings, the following of which is a brief description.

DETAILED DESCRIPTION

Figure 1:
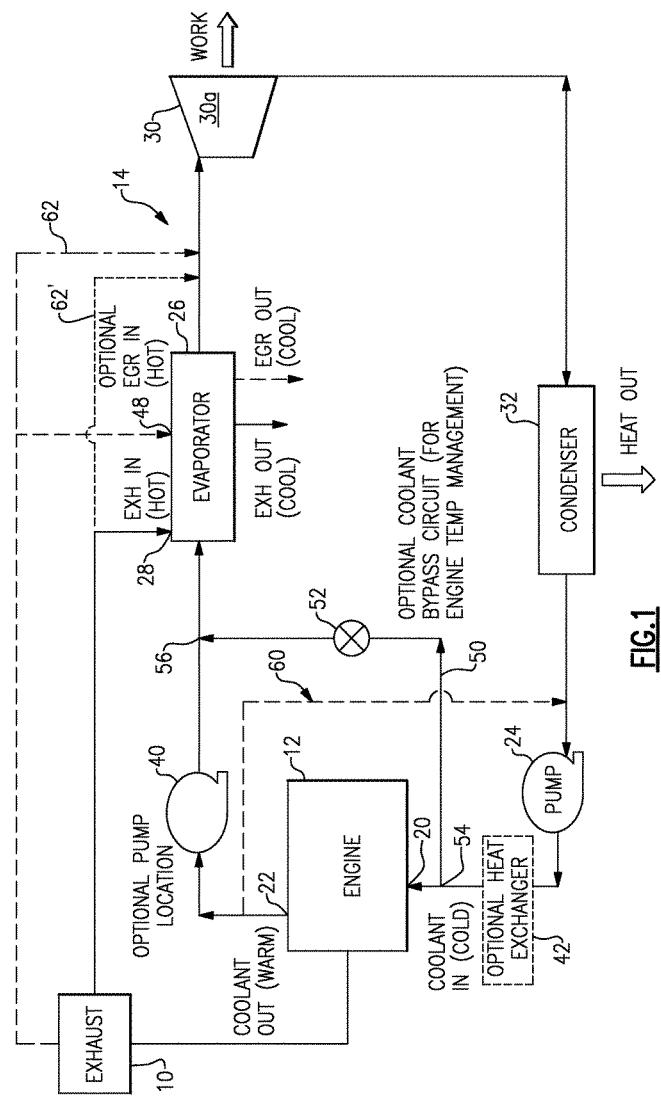
FIG. 1 schematically illustrates an exhaust Rankine System and an engine coolant flow recovery system.

FIG. 1 shows a vehicle exhaust system 10 that is used to reduce emissions from exhaust gases generated by an engine 12. The exhaust system 10 can be comprised of various components such as diesel oxidation catalysts (DOC), selective catalytic reduction (SCR) catalysts, particulate filters, exhaust pipes, mufflers, etc. The engine 12 includes a cooling circuit that prevents the engine 12 from overheating. A Rankine cycle 14 is used to recover engine energy lost to both the engine exhaust and engine coolant. This is accomplished by using the engine coolant as the Rankine working fluid, resulting in significantly improved engine efficiency.

The engine 12 has a coolant inlet 20 and a coolant outlet 22. A pump 24 pumps the working fluid, i.e. the coolant, into the coolant inlet 20 where the coolant cools the engine 12. The coolant then exits the coolant outlet 22 and is conducted into an evaporator 26. The evaporator 26 also receives hot exhaust gases from the exhaust system 10, as indicated at 28, which evaporate the coolant. The evaporated coolant is then directed into an expander 30, which provides a work output. Expanders can comprise a turbine type, a piston type, or a vane type, for example. In one example the expander 30 is a turbine 30a which is driven by the vaporized working fluid to produce electrical energy.

The coolant then exits the expander 30 as a wet vapor at a lower pressure. The wet vapor is directed into a condenser 32 where the coolant is returned to liquid form. Fluid exiting the condenser 32 is then fed into the pump 24 which increases fluid pressure and starts the cycle again.

An additional pump 40 may be used downstream of the coolant outlet 22 and upstream of the evaporator 26 as needed. Optionally, this pump location can comprise another location for the pump 24 in a single pump configuration. An additional heat exchanger 42 may also be used between the condenser 32 and the coolant inlet 20 as needed. In one example, the heat exchanger 42 is located downstream from the pump 24 and upstream of the coolant inlet 20.

Further, in addition to being heated by the exhaust gases from the exhaust system 10 as indicated at 28, the evaporator 26 could additionally be heated via an exhaust gas recirculation (EGR) circuit as indicated at 48. The EGR recirculates exhaust gases into an engine intake as known.

In one example, a coolant bypass 50 is used to direct coolant around the engine 12. The bypass 50 comprises a variable bypass such that part of the working fluid passes through the engine coolant circuit, with the remaining portion bypassing the circuit. This could be done in addition to a water pump and thermostat that already exist in the engine, or could be in place of the pump and thermostat. In one example, the bypass 50 includes a valve 52 or other structure that is configured to direct a portion of the coolant from a location upstream 54 of the coolant inlet 20 to a location downstream 56 of the coolant outlet 22. This allows the engine temperature to be more quickly increased as needed, such as during a start-up condition for example.

Optionally, the system can be configured such that the working fluid completely bypasses the Rankine cycle (evaporator/expander/condenser) as needed to meet certain engine operation conditions. This is schematically shown at 60. Additionally, or optionally, the exhaust gases and EGR gases can bypass the evaporator as needed for engine operation at certain conditions. This is schematically indicated at 62, 62'. These bypasses 60, 62, 62' would include valves (not shown) or other flow control structures to direct the coolant and/or gases as needed.

By using the coolant itself as the Rankine working fluid, all of the coolant heat can be captured for energy recovery in addition to recovering engine exhaust energy. Further, this is accomplished without adding any significant cost or complexity as existing system components are utilized. This provides for significant improvement in engine efficiency as compared to prior methods that extracted coolant energy using additional heat exchangers between a coolant and a separate Rankine working fluid, which suffered as a result of a very low efficiency transfer due to very low temperature differences.

Figure 2:
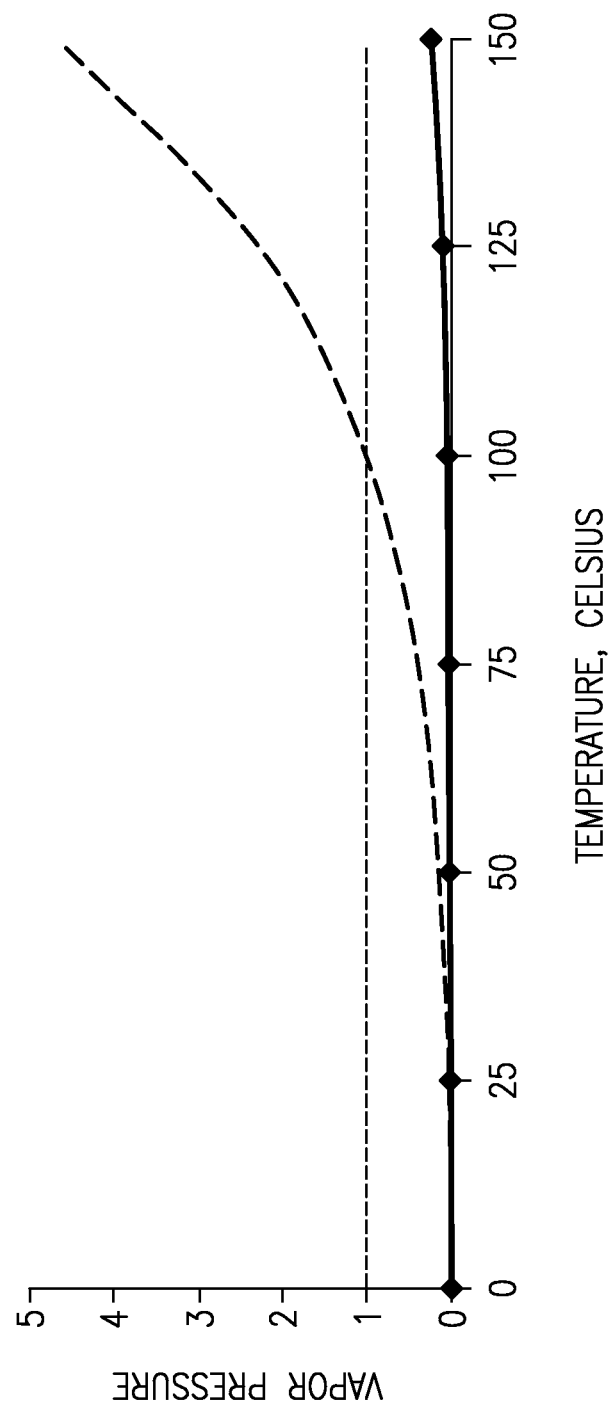
FIG. 2 is a graph showing Vapor Pressure vs. Temperature.

The coolant must be able to perform both the function of cooling the engine as well as serving as an appropriate working fluid for the Rankine cycle. One example, of such a coolant fluid is ethylene glycol. FIG. 2 shows a graph of Vapor Pressure (bar) versus Temperature (Celsius) for ethylene glycol. A typical engine coolant temperature is 100 degrees Celsius, while an average exhaust gas temperature is 300 degrees Celsius. The graph shows that at 100 degrees Celsius the vapor pressure is at 1 bar pressure, which corresponds to standard atmospheric temperature. At 150 degrees Celsius however, the ethylene glycol will be vapor. Thus, ethylene glycol will not evaporate at engine coolant temperatures but will evaporate at exhaust temperatures, which would easily exceed 150 degrees Celsius.

While ethylene glycol is shown to be an appropriate coolant/working fluid, it should be understood that other working fluids could also be used. Alternate working fluids include water, a mixture of water and alcohol, a mixture of ethylene glycol and water, or refrigerant, for example. Further, any of the working fluids associated with conventional Rankine cycles may also be used as a coolant/working fluid in the subject heat recovery system.

The subject invention uses a single Rankine system to recover both exhaust energy and engine coolant heat. This is accomplished by using the engine coolant itself as the working fluid. Recovering energy from the coolant in addition to recovering the exhaust energy from the exhaust system significantly improves engine efficiency.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A heat recovery system comprising:
   an engine coolant fluid configured to cool an engine;
   a Rankine cycle system utilizing a working fluid to convert heat from engine exhaust gases to energy, wherein said engine coolant fluid comprises said working fluid;
   an evaporator, an expander, a condenser, and a pump wherein said working fluid exits said condenser and is pumped to a higher pressure with said pump prior to entering an engine coolant inlet, and wherein said working fluid exits the engine via an engine coolant outlet and enters said evaporator where said working fluid is vaporized by hot exhaust gases generated by the engine, and wherein vaporized working fluid drives said expander to produce a work output, and wherein said working fluid is subsequently returned to said condenser; and
   a variable coolant bypass circuit that selectively allows a portion of the working fluid exiting said condenser to bypass the engine and enter said evaporator, and wherein said variable coolant bypass circuit connects working fluid exiting said pump upstream of said engine coolant inlet to a connection that is upstream of said evaporator and downstream of said engine coolant outlet.

2. The heat recovery system according to claim 1 wherein said working fluid comprises ethylene glycol.

3. The heat recovery system according to claim 1 wherein said engine coolant fluid flows through an engine coolant circuit and wherein said working fluid flows through a Rankine circuit, and wherein said engine coolant circuit and said Rankine circuit comprise a common circuit such that the Rankine cycle system recovers energy from exhaust gas heat and from engine coolant heat.

4. The heat recovery system according to claim 1 including an exhaust gas recirculation circuit that supplies heat to said evaporator.

5. A heat recovery system comprising:
   an exhaust system receiving heated exhaust gases from an engine;
   an engine coolant circuit that utilizes an engine coolant fluid to cool the engine;
   a Rankine circuit utilizing a working fluid to convert heat from the exhaust gases to energy, wherein said engine coolant circuit and said Rankine circuit comprise a common circuit such that the Rankine circuit recovers energy from exhaust gas heat and from engine coolant heat;
   a pump that pumps the working fluid to an engine coolant inlet;
   an evaporator that receives the working fluid from an engine coolant outlet and receives the heated exhaust gases from the engine;
   an expander that receives vaporized working fluid from the evaporator;
   a condenser that receives working fluid from the expander and conducts the working fluid to the pump; and
   a heat exchanger downstream of the pump and upstream of the engine coolant inlet.

6. The heat recovery system according to claim 5 wherein said working fluid comprises ethylene glycol.

7. The heat recovery system according to claim 5 including an exhaust gas recirculation circuit that supplies heat to said evaporator.

8. The heat recovery system according to claim 5 including a variable coolant bypass circuit that selectively allows a portion of the working fluid exiting said condenser to bypass the engine and enter said evaporator.

9. A heat recovery system comprising:
an exhaust system receiving heated exhaust gases from an engine;
an engine coolant circuit that utilizes an engine coolant fluid to cool the engine;
a Rankine circuit utilizing a working fluid to convert heat from the exhaust gases to energy, wherein said engine coolant circuit and said Rankine circuit comprise a common circuit such that the Rankine circuit recovers energy from exhaust gas heat and from engine coolant heat;
a pump that pumps the working fluid to an engine coolant inlet;
an evaporator that receives the working fluid from an engine coolant outlet and receives the heated exhaust gases from the engine;
an expander that receives vaporized working fluid from the evaporator;
a condenser that receives working fluid from the expander and conducts the working fluid to the pump; and
a Rankine bypass circuit that selectively allows the working fluid to completely bypass the Rankine circuit such that coolant exiting the engine coolant outlet is returned directly to the pump.

10. A heat recovery system comprising:
an exhaust system receiving heated exhaust gases from an engine;
an engine coolant circuit that utilizes an engine coolant fluid to cool the engine;
a Rankine circuit utilizing a working fluid to convert heat from the exhaust gases to energy, wherein said engine coolant circuit and said Rankine circuit comprise a common circuit such that the Rankine circuit recovers energy from exhaust gas heat and from engine coolant heat;
a pump that pumps the working fluid to an engine coolant inlet;
an evaporator that receives the working fluid from an engine coolant outlet and receives the heated exhaust gases from the engine;
an expander that receives vaporized working fluid from the evaporator;
a condenser that receives working fluid from the expander and conducts the working fluid to the pump; and; and
an evaporator bypass that selectively allows exhaust gases to bypass the evaporator.

11. A heat recovery system comprising:
an exhaust system receiving heated exhaust gases from an engine;
an engine coolant circuit that utilizes an engine coolant fluid to cool the engine;
a Rankine circuit utilizing a working fluid to convert heat from the exhaust gases to energy, wherein said engine coolant circuit and said Rankine circuit comprise a common circuit such that the Rankine circuit recovers energy from exhaust gas heat and from engine coolant heat;
a pump that pumps the working fluid to an engine coolant inlet;
an evaporator that receives the working fluid from an engine coolant outlet and receives the heated exhaust gases from the engine;
an expander that receives vaporized working fluid from the evaporator;
a condenser that receives working fluid from the expander and conducts the working fluid to the pump; and
a second pump downstream of the engine coolant outlet and upstream of the evaporator.

* * * * *